United States Patent
Jaouen et al.

(10) Patent No.: US 12,339,762 B2
(45) Date of Patent: Jun. 24, 2025

(54) METHOD FOR MONITORING AN EXECUTION OF A PROGRAM CODE PORTION AND CORRESPONDING SYSTEM-ON-CHIP

(71) Applicant: STMicroelectronics (Grand Ouest) SAS, Le Mans (FR)

(72) Inventors: Michel Jaouen, Yvre L'eveque (FR); Loic Pallardy, Rouillon (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 162 days.

(21) Appl. No.: 18/306,032

(22) Filed: Apr. 24, 2023

(65) Prior Publication Data

US 2023/0342279 A1 Oct. 26, 2023

(30) Foreign Application Priority Data

Apr. 26, 2022 (FR) ...................................... 2203873

(51) Int. Cl.
*G06F 11/34* (2006.01)
*G06F 11/3604* (2025.01)

(52) U.S. Cl.
CPC ...... *G06F 11/3466* (2013.01); *G06F 11/3612* (2013.01)

(58) Field of Classification Search
None
See application file for complete search history.

(56) References Cited

U.S. PATENT DOCUMENTS

| | | | |
|---|---|---|---|
| 6,665,821 B1* | 12/2003 | Miyayama | G06F 11/3656 714/45 |
| 6,934,887 B1 | 8/2005 | Baldischweiler | |
| 10,747,645 B2* | 8/2020 | Myers | G06F 11/302 |
| 2011/0173199 A1* | 7/2011 | Heisig | G06F 11/3452 707/E17.091 |
| 2011/0209158 A1* | 8/2011 | Paul | G06F 9/30076 712/E9.029 |
| 2017/0329664 A1* | 11/2017 | Nitsan | G06F 11/321 |
| 2018/0314436 A1* | 11/2018 | Basu | G06F 11/34 |
| 2021/0089400 A1* | 3/2021 | Kashani | G06F 11/1492 |
| 2021/0216400 A1* | 7/2021 | Meaney | G06F 11/3037 |
| 2022/0035927 A1 | 2/2022 | Lysecky et al. | |

FOREIGN PATENT DOCUMENTS

EP 3460702 A1 3/2019

* cited by examiner

*Primary Examiner* — Andrew M. Lyons
(74) *Attorney, Agent, or Firm* — Slater Matsil, LLP

(57) ABSTRACT

A method is provided for monitoring an execution of a selected program code portion stored in a memory address range between a start address and an end address. The method includes starting a timing when a program counter points to the start address of the selected program code portion. Current values of the program counter are compared with a set of target addresses specific to the selected program code portion including the end address of the selected program code portion. The timing is stopped when the program counter points to the end address of the selected program code portion. An error signal is generated in response to the timing duration being outside a nominal duration range specific to the selected program code portion.

20 Claims, 11 Drawing Sheets

METHOD FOR MONITORING AN EXECUTION OF A PROGRAM CODE PORTION AND CORRESPONDING SYSTEM-ON-CHIP

CROSS-REFERENCE TO RELATED APPLICATIONS

This application claims priority to French Application No. 2203873, filed on Apr. 26, 2022, which application is hereby incorporated herein by reference.

TECHNICAL FIELD

The present disclosure relates generally to techniques for monitoring the execution of a program code.

BACKGROUND

Techniques for monitoring the execution of a program may be used for security purposes, in order to detect attempts to breach secrets, typically employing fault injection techniques. When fault injection is performed in a system, instructions are modified or not executed but the processing unit continues to execute subsequent instructions of the code. This leads to uncontrolled operation and, under certain conditions, allows access to sensitive or secret information. In particular, these conditions may be just after start-up, when the code is not fully initialised and operating system protections (such as memory access rights management mechanisms) are not in place; or during a critical operation, for example an operation with a maximum access rights level, such as operations of access rights scheduling or execution context switching (for example between secure and non-secure contexts).

The techniques for monitoring the execution of a program can also be used for safety purposes, in other words for reliability, in order to detect a malfunction in the execution of the program. Typically, coding rules are set up in design of the program in order to perform checks at strategic stages.

SUMMARY

The present disclosure relates generally to techniques for monitoring the execution of a program code, for example an execution of a code contained in a memory address range by a processing unit of a system-on-chip.

The inventors of the present disclosure have recognized that conventional monitoring techniques, such as the coding of a flow control, duplication of call functions, decorrelated function checking actions, or the introduction of random loops to complicate the reproduction of fault injections, all have the disadvantage of being very intrusive in the development of the program code, are not applicable at the beginning of the start-up, and introduce latencies in the execution of critical sections of the program. On the other hand, some of these techniques can be countered by fault injections into unexpected parts of the program and by multiple fault injection techniques (which may only exist in theory but could be put into practice).

Embodiments of the present disclosure address or overcome at least some of the drawbacks of conventional techniques, both from a security and a safety perspective, by providing techniques for monitoring the execution of a program code (or at least a selected part of the code), which are not or minimally restrictive on the development of the monitored program code, which introduce no or little latency, which are applicable at the beginning of the start-up, and which allow no or little countermeasure to their actions.

In one or more embodiments, a method is provided for monitoring, implemented by monitoring circuitry, an execution by processing circuitry of a selected program code portion stored in a memory address range between a start address and an end address, the processing circuitry using a program counter pointing to the address of an instruction executed by the processing circuitry. The method includes: starting a timing when the program counter points to the start address of the selected program code portion; comparing current values of the program counter with a set of target addresses specific to the selected program code portion including the end address of the selected program code portion; stopping the timing when the program counter points to the end address of the selected program code portion; and generating an error signal in response to the timing duration being outside a nominal duration range specific to the selected program code portion.

For example, the timing may correspond in practice to counting the number of cycles of a clock signal between the execution of the start address and the end address. The clock signal may for example, in a simple case, be the clock signal clocking the execution by the processing circuitry. By timing the number of cycles, it is possible to control the number of instructions executed. Indeed, each instruction costs a certain number of cycles which can be defined for each architecture of the processing circuitry, and for example also for the peripheral architecture of the processing circuitry within a system-on-chip. Thus, the nominal duration range specific to the selected code portion corresponds to a successful execution, that is, without malfunction or uncontrolled operation, of the instructions associated with that code portion.

Furthermore, the monitoring circuitry, in at least some embodiments, only uses a reading of the program counter and the knowledge of the nominal duration range specific to the selected program code portion, and thus acts independently of the execution of the code. As a result, the method according to at least some embodiments may be adapted, in particular, to an application at the beginning of the start-up, before the program code and the corresponding software protections are fully initialized. Furthermore, the implementation of the method according to some embodiments does not create any restrictions on the writing of the monitored program code, and does not introduce any latency in the execution of a program code.

In some embodiments, the monitoring circuitry can have a hardware configuration to implement the monitoring, and thus in a way that is virtually impossible to corrupt or modify.

According to one or more embodiments, the selected program code portion includes at least one call function configured to call a second program code portion stored in a second memory address range between a second start address and a second end address, and the set of target addresses specific to the selected program code portion includes the second start address, and the method further includes performing a call integration procedure when the program counter points to the second start address, and the call integration procedure includes: suspending the timing; storing a value of the suspended timing; and resuming the suspended timing, from the stored value, when the program counter points to the second end address.

Therefore, the monitoring method in accordance with at least some embodiments is compatible with call functions, which may be non-systematic and therefore not fully predictable during program development. The call integration procedure thus allows the number of instructions executed by the selected program code portion to be accurately monitored, without being distorted by unexpected instructions from the call.

In some embodiments, the call integration procedure further includes, with the second program code portion as the selected program code portion: starting a further timing; comparing the current values of the program counter with another set of target addresses specific to the selected second program code portion; stopping the further timing; and generating the error based on another nominal duration range specific to the selected second program code portion. In some embodiments, the method may further include performing a further-call integration procedure.

Thus, the monitoring method, in accordance with one or more embodiments, independently takes account of the implementation duration of the first selected code portion and the implementation duration of a second selected code portion called by the execution of the first code portion, allowing for a more accurate control of the number of instructions executed by each of the selected code portions.

According to one or more embodiments, the nominal duration range is based on a number of clock cycles of a nominal execution by the processing circuitry, and a delay caused by instruction fetches from memory.

Indeed, as mentioned above, each instruction of the selected code portion may take a certain number of cycles to be executed according to the architecture of the system-on-chip incorporating the processing circuitry, but also taking account of the duration necessary or desirable to fetch instructions from a memory containing the instructions, again according to the architecture and the actual performance of the system-on-chip.

According to one or more embodiments, the nominal duration range is automatically adjusted based on the activity of the processing circuitry, which may be communicated by or may include at least one of the following parameters: the frequency of a clock signal clocking the execution of the processing circuitry; a cache instruction admission event; a cache data admission event; a cache data eviction event; or a wait state of the processing circuitry.

Thus, the monitoring method according to some embodiments automatically adapts the nominal duration range according to the actual performance according to the context of a given execution, based on information signals communicated by the processing circuitry.

According to one or more embodiments, the timing is clocked by a clock signal distinct from a clock signal clocking the execution of the processing circuitry.

The monitoring circuitry may in some embodiments be clocked by an independent clock signal, for example in order to be always clocked at an operational frequency for its configuration, even if the frequency of the clock signal clocking the processing circuitry is modified.

According to one or more embodiments, the selected program code portion belongs to a starting phase of the execution of a program code by the processing circuitry, before access rights management protections mechanisms are effective, or belongs to a critical phase of the execution by the processing circuitry having a most permissive access right. In some embodiments, the selected program code portion may be executed as part of at least one of a starting phase of the processing circuitry before access rights management protection mechanisms are effective, or a critical phase of the processing circuitry having a most permissive access right.

According to one or more embodiments, there is also provided a method for manufacturing a system-on-chip adapted to implement the monitoring methods provided herein, including designing the program code including the selected program code portion, manufacturing the processing circuitry and the monitoring circuitry with a hardware configuration adapted to the designed program code, and storing the program code in a memory of the system-on-chip.

In one or more embodiments, a device, which may be a system-on-chip in some embodiments, is provided that includes: processing circuitry configured to execute a selected program code portion stored in a memory address range, between a start address and an end address, and to generate a program counter pointing to an address of an executed instruction; and monitoring circuitry configured to monitor the execution of the selected program code portion. The monitoring circuitry includes: a comparator circuit configured to compare current values of the program counter with a set of target addresses specific to the selected program code portion including the end address of the selected program code portion; a counter circuit configured to start a timing when the program counter points to the start address of the selected program code portion and to stop the timing when the program counter points to the end address of the selected program code portion; a decision circuit configured to generate an error signal in response to the timing duration being outside a nominal duration range specific to the selected program code portion.

According to one or more embodiments, the selected program code portion includes at least one call function configured to call a second program code portion stored in a second memory address range between a second start address and a second end address, and the set of target addresses specific to the selected program code portion includes the second start address, the monitoring circuitry being configured to: suspend the timing with the counter circuit; store a value of the suspended timing; and resume the suspended timing from the stored value when the program counter points to the second end address.

According to one or more embodiments, the monitoring circuitry is configured to parameterise the comparator circuit, the counter circuit and the decision circuit, with the second program code portion as the selected code portion, and with a set of target addresses and a nominal duration range specific to the second program code portion.

According to one or more embodiments, the nominal duration range is based on a number of clock cycles of a nominal execution by the processing circuitry, and a delay caused by instruction fetches from memory.

According to one or more embodiments, the decision circuit is configured to automatically adjust the nominal duration range based on at least one of: the frequency of a clock signal clocking the execution of the processing circuitry; an instruction cache admission event; a data cache admission event; a data cache eviction event; or a wait state of the processing circuitry.

According to one or more embodiments, a clock generator configured to generate a clock signal to clock the execution of the processing circuitry, and the counter circuit is configured to generate a distinct clock signal to clock the timing.

According to one or more embodiments, an access rights management circuit is configured to operate an access rights management protection mechanism for instructions executed by the processing circuitry, and the monitoring circuitry is configured to monitor the selected program code portion belonging to a starting phase of the execution by the processing circuitry, before the access rights management protection mechanisms are operational, or belonging to a critical phase of the execution by the processing circuitry having a most permissive access right.

In one or more embodiments, a device is provided that includes monitoring circuitry configured to monitor execution, by processing circuitry, of a selected program code portion stored in a memory address range, between a start address and an end address. The monitoring includes: comparing current values of a program counter generated by the processing circuitry with a set of target addresses specific to the selected program code portion including the end address of the selected program code portion; starting a timing when the program counter points to the start address of the selected code portion; stopping the timing when the program counter points to the end address of the selected program code portion; and generating an error signal in response to the timing duration being outside a nominal duration range specific to the selected program code portion.

In one or more embodiments, the selected program code portion includes at least one call function configured to call a second program code portion stored in a second memory address range between a second start address and a second end address, and the set of target addresses specific to the selected program code portion includes the second start address.

In one or more embodiments, the nominal duration range is based on a number of clock cycles of a nominal execution by the processing circuitry, and a delay caused by instruction fetches from memory.

In one or more embodiments, the monitoring circuitry is configured to automatically adjust the nominal duration range based on at least one of: the frequency of a clock signal clocking the execution of the processing circuitry, a cache instruction admission event, a cache data admission event, a cache data eviction event, or a wait state of the processing circuitry.

Ion one or more embodiments, the device includes a clock generator configured to generate a first clock signal to clock the execution of the processing circuitry, wherein the monitoring circuitry is configured to generate a second clock signal to clock the timing

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
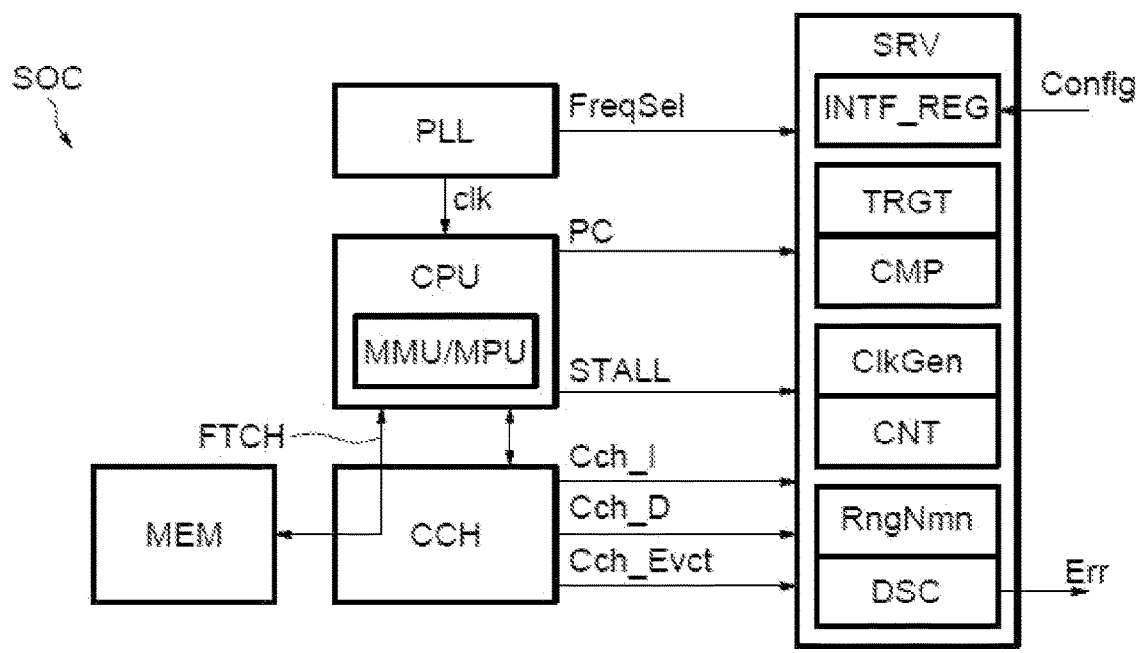
FIG. 1 is a schematic diagram illustrating a system-on-chip device, in accordance with one or more embodiments.

FIG. 1 illustrates an example of a system-on-chip SOC including processing circuitry CPU (which may be referred to herein as a processing unit CPU) configured to execute program code stored in a memory MEM. The processing circuitry CPU or processing unit CPU may be or include any suitable circuitry configured to perform the operations described herein with respect to the processing circuitry CPU, and in various embodiments may be implemented in a computer processor, a microprocessor, a microcontroller, or the like. The execution of the processing unit CPU is clocked by a clock signal clk generated by a clock generator PLL, for example of the phase locked loop type, dedicated to the processing unit.

The processing unit CPU is configured to use a program counter PC (sometimes called an instruction pointer) pointing to the address of the instruction executed by the processing unit CPU. The terms "to point" and "pointer" are used in their usual technical meaning, that is, a pointer to information is a computing object containing the address of the memory location that contains the information, and the verb "to point" means to designate information by the address of the memory location that contains the information.

The system-on-chip SOC may or may not be equipped with a peripheral of cache CCH, for example depending on the desired performance of the processing unit CPU and the system-on-chip SOC. Advantageously, the system-on-chip SOC is fitted with an access rights management circuit MMU/MPU configured, in collaboration with the processing unit CPU, to implement an access rights management protection mechanism for instructions executed by the processing unit CPU. The access rights management circuit MMU/MPU may for example include one or more of memory management circuitry (which may be referred to herein as a memory management unit), memory protection circuitry (which may be referred to herein as a memory protection unit), and secure attribution circuitry (which may be referred to herein as a secure attribution unit).

The system-on-chip further includes monitoring circuitry SRV (which may be referred to herein as a monitoring unit SRV) configured to monitor the execution of at least one portion of the selected program code (for example the portion Rst in FIG. 2A) stored in a memory address range (AddRst), that is, between a start address and an end address. The monitoring circuitry SRV may be or include any suitable circuitry configured to perform the operations described herein with respect to the monitoring circuitry SRV, and in various embodiments may be implemented by processing circuit such as a computer processor, a microprocessor, a microcontroller, or the like. For example, the monitoring circuitry can comprise processing circuitry and a memory storing monitoring program code that, when executed by the monitoring processing circuitry, causes the monitoring processing circuitry to perform the operations described herein.

Advantageously, the monitoring unit SRV is configured to monitor a code portion Rst belonging to a starting phase of the processing unit CPU, such as the reset phase Rst described below in connection with FIG. 2A, especially before the access rights management protection mechanisms are operational. Advantageously also, the monitoring unit SRV is configured to monitor a code portion Rst that belongs to a critical operation executed by the processing unit having a most permissive access right, such as a configuration or context switching phase on the different levels of access rights, for example configurations of access rights assignments to memory regions (usually "mappings/demappings"), cache flushing or invalidation operations between secure and non-secure contexts.

For example, the monitoring unit SRV can have a hardware configuration adapted to the program code, in particular the program code of the system starting phase. Thus, manufacturing the system-on-chip SOC comprises, on the one hand, designing the program code Intr, Rst, ProtSet, ProtChck, ClkSet, ClkEnLp (FIG. 2A) including the selected program code portion Rst. Then, on the other hand, manufacturing the processing unit CPU and the monitoring unit SRV thus with the hardware configuration, and then storing the designed program code in the memory MEM of the system-on-chip SOC.

That being the, the monitoring unit SRV advantageously includes interface registers INTF_REG, which are adapted to receive configuration commands Config in order to reconfigure the monitoring unit SRV or else to complete the configuration for new code zones.

For monitoring the code portion Rst, the monitoring unit SRV includes a comparator circuit CMP, adapted to condition the implementation of the monitoring according to the address pointed to by the program counter PC; a counter circuit CNT, adapted to time the execution time of the monitored program code portion; and a decision circuit DSC, adapted to generate an error signal Err if the timing does not correspond to a normal execution of the program code.

Figure 2A:
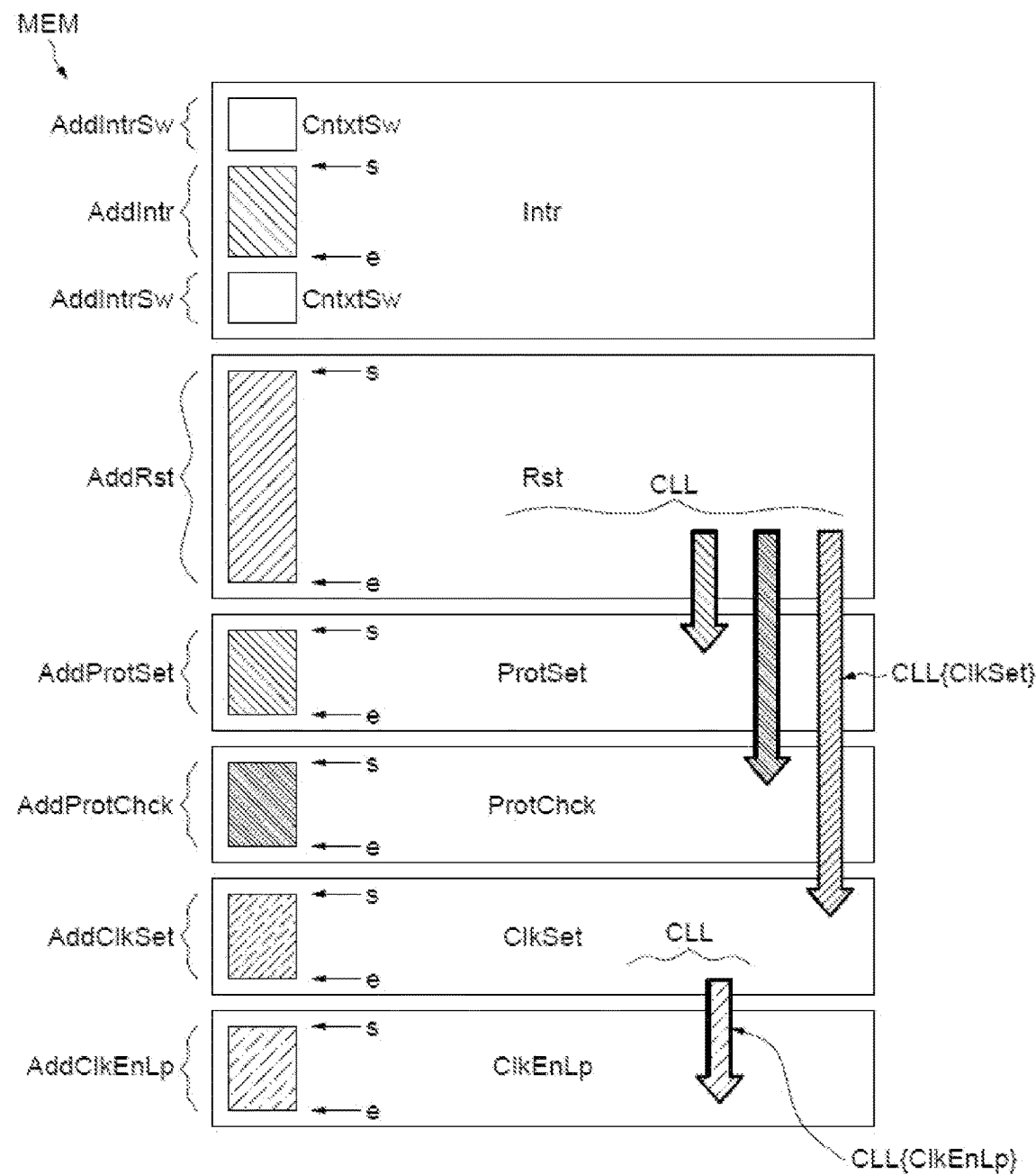
FIGS. 2A, 2B, and 2C schematically illustrate a mapping of the memory containing the program code, the selected program code portion, and other code portions that can be called by call functions, in accordance with one or more embodiments.
Figure 2B:
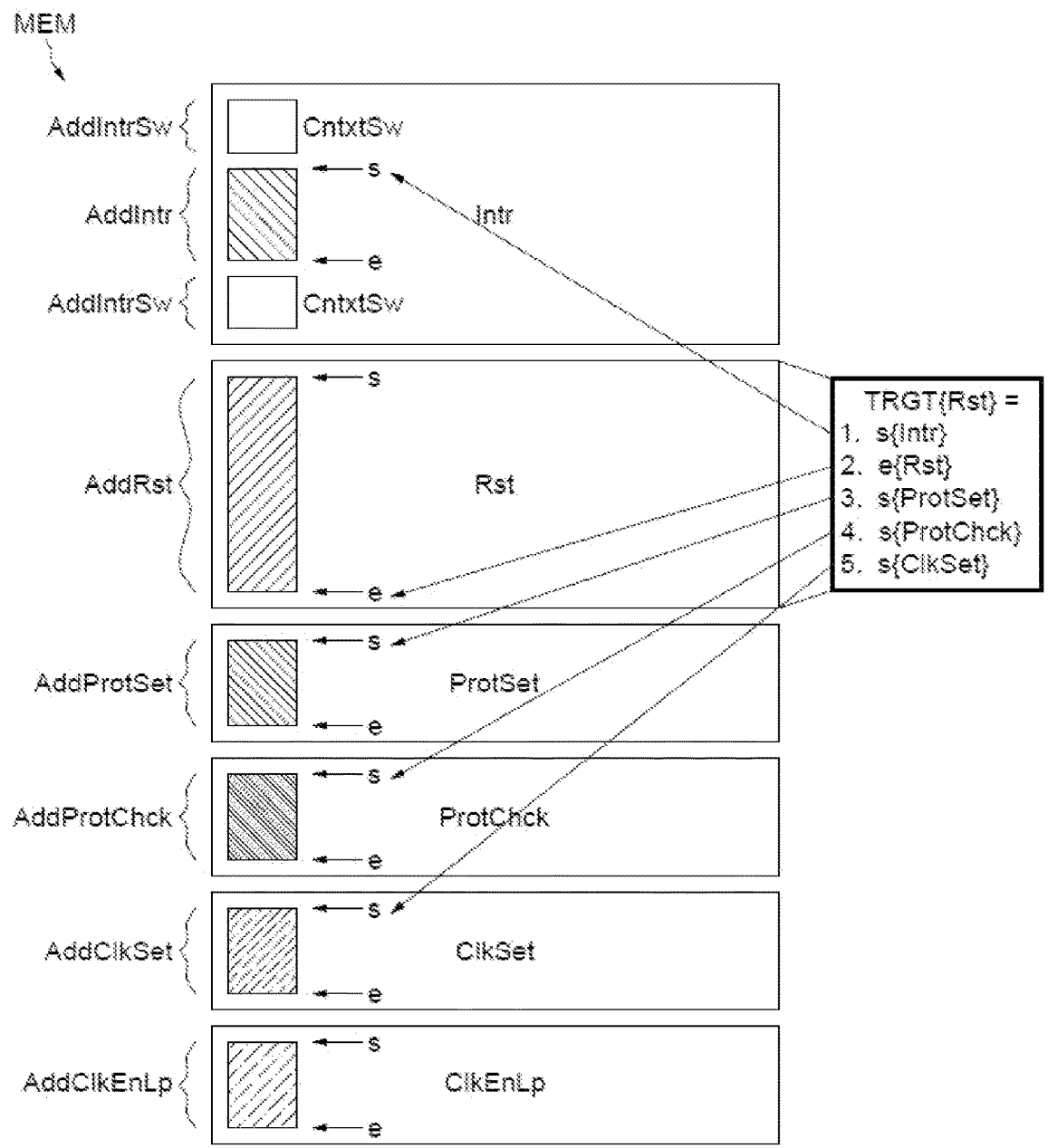

The comparator circuit CMP is configured to compare current values of the program counter PC, communicated by the processing unit CPU, with a set of target addresses TRGT specific to the selected code portion Rst including especially the end address of the selected code portion e{Rst} (FIG. 2B). The sets of target addresses TRGT of each code portion that can be monitored are for example contained in a register.

The counter circuit CNT is configured to start a timing when the program counter PC points to the start address of the selected code portion s{Rst} (FIG. 2B) and to stop the timing when the program counter PC points to the end address of the selected code portion e{Rst} (FIG. 2B).

For example, the timing corresponds in practice to counting the number of cycles of a clock signal between the execution of the start address and the end address. The clock signal used to clock the CNT counter may for example be the clock signal clk for the processing unit CPU, or it may be from an internal clock generator ClkGen of the monitoring unit SRV configured to generate a distinct clock signal.

The decision circuit DSC is configured to generate the error signal Err if the duration measured by the timing is outside a nominal duration range NmnlRng specific to the selected code portion. The nominal duration range NmnlRng advantageously takes account of the architecture and the actual performance of the system-on-chip SOC, for example the presence or absence of a cache device CCH.

By counting the number of clock cycles elapsed between the start address and the end address, it is thus possible to control the number of instructions executed in the selected code portion. Indeed, each instruction is executed over a certain number of cycles, known during the development of the program code, which may depend on the architecture of the system-on-chip SOC and the processing unit CPU.

The nominal duration range NmnlRng is thus specifically defined for each code portion according to a number of clock cycles of a nominal execution by the processing unit CPU. By "nominal execution", it is meant a successful execution of this code portion, as intended in designing the program code, that is, without under- or over-instruction or different from those intended, for example especially without malfunction and especially without fault injection.

The nominal duration range NmnlRng specific to each selected code portion can furthermore advantageously take account of the actual performance of the system-on-chip SOC, in particular a delay caused by instruction fetches FTCH from memory MEM. Indeed, the duration necessary to fetch instructions from the memory MEM containing the instructions may depend on the architecture of the system-on-chip SOC, for example the size of the memory MEM, the communication protocol used with the memory, the technology of the memory ("EEPROM", "Flash", "resistive memory", etc.), or even the fact that the memory is internal or external to the processing unit CPU or even external to the system-on-chip SOC.

Furthermore, the decision circuit DCS is advantageously configured to automatically adjust the nominal duration range NmnlRng according to the activity of the processing unit CPU. The activity of the processing unit CPU may depend on an operating mode, such as a standby mode, a power saving mode or a performance mode, but also on the availability of the cache CCH locations, or on a wait state of the processing unit CPU for example due to a conflict with another device on a shared memory access bus. Thus, the activity of the processing unit CPU cannot be anticipated during the development of the program code, but the effects of these different activity conditions on the nominal execution duration of the selected code portion are known. Furthermore, these different conditions can be communicated to the monitoring unit SRV by signals generated by the processing unit CPU, in order to automatically adjust the nominal duration range NmnlRng to the actual conditions.

The activity of the processing unit CPU may be communicated to the monitoring unit SRV by at least one of the following parameters: the frequency FreqSel of the clock signal clk clocking the execution of the processing unit; a cache data admission event Cch_I, so that a next fetch of this instruction will be faster in terms of clock cycles; a cache data admission event Cch_D, so that a next fetch of this data will be faster in terms of clock cycles; a cache data eviction event Cch_Evct so that a next fetch of this data will be slower in terms of clock cycles; a wait state STALL of the processing unit, during which the current instruction is not executed.

In some embodiments, the counter circuit CNT and the decision circuit DCS can be combined in a single circuit of the down counter type initialised at a start value corresponding to the number of clock cycles clk of the processing unit CPU, in the slowest case (for example in the absence of a cache). A proportionality factor can be applied to the start value to take account of the difference between the FreqSel frequency of the clock signal clk clocking the processing unit CPU and the frequency of the clock signal clocking the countdown CNT.

At each clock cycle, the countdown value is decremented. In case of a cache instruction admission event Cch_I, the countdown value is reduced by an amount corresponding to the gain, in number of clock cycles, for fetching the instruction from the cache. In case of a cache data admission event Cch_D, the countdown value is reduced by an amount corresponding to the gain, in number of clock cycles, for fetching the data from the cache. In case of a cache data eviction event Cch_Evct, the countdown value is increased by an amount corresponding to the loss, in number of clock cycles, for fetching the data from the memory MEM.

When the countdown value is equal to zero, the error signal Err is generated.

When the program counter PC points to the end address "e" and the countdown value is zero, the error signal Err is not generated; whereas when the program counter PC points to the end address "e", and the countdown value is greater than zero, the error signal Err is generated.

Alternatively, when the program counter PC points to the end address "e" and the countdown value is between zero and a tolerance threshold, the error signal Err is not generated; whereas when the program counter PC points to the end address "e", and the countdown value is greater than the tolerance threshold, the error signal Err is generated.

On the other hand, the monitoring unit can take account of possible call functions, in the selected program code portion, to another program code portion. Indeed, the execution of a call function results in an execution of a program code contained outside the memory address range AddRst (FIG. 2A), in a way that is not necessarily predictable, which could a priori distort the count of the number of instructions in a nominal execution NmnlRng compared to the measured timing. This is also the case for executions arising from interrupts Intr (FIG. 2A), which can occur at anytime during the execution of a given code portion, and are typically unpredictable.

Figure 2C:
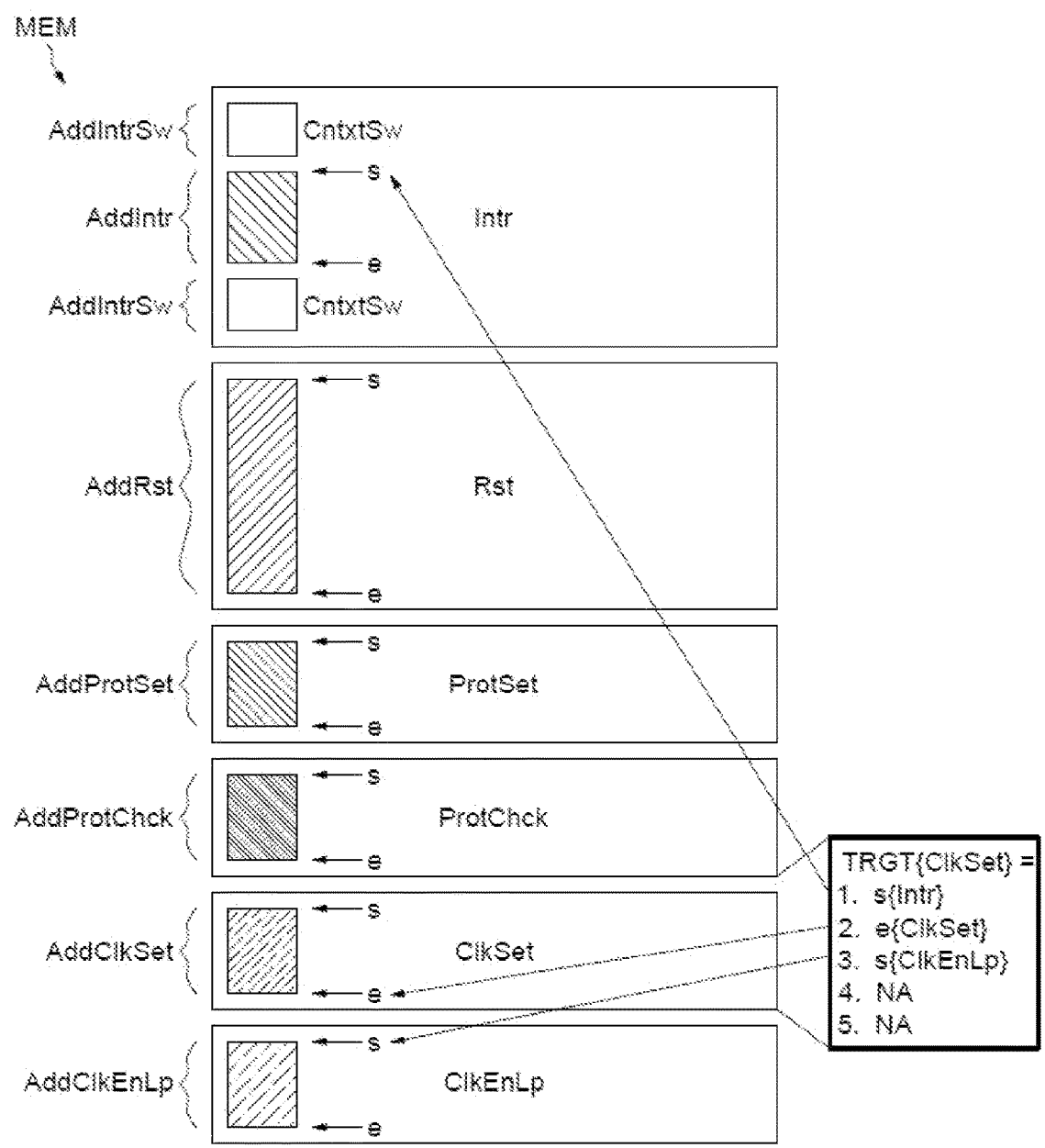

Reference is made in this respect to FIGS. 2A, 2B and 2C.

FIG. 2A schematically illustrates a mapping of the memory MEM containing the program code, and containing in particular the selected program code portion Rst, as well as other code portions that can be called by call functions CLL.

The selected code portion is for example a reset procedure Rst, typically implemented during the first steps of starting or rebooting the system-on-chip SOC.

The reset code portion Rst is stored in a memory address range AddRst located between a start address "s" and an end address "e".

In this example, the reset code portion Rst may call CLL: a protection setting code portion ProtSet stored in another memory address range AddProtSet between a start address "s" and an end address "e"; a protection check code portion ProtChck stored in another memory address range AddProtChck between a start address "s" and an end address "e"; and a clock modification code portion ClkSet, for example to modify the frequency of the clock signal clk of the processing unit CPU, stored in another memory address range AddClkSet between a start address "s" and an end address "e".

The clock modification code portion ClkSet may in turn call CLL{ClkEnLp} a clock enable loop code portion, stored in another memory address range AddClkEnLp between a start address "s" and an end address "e".

Finally, all code portions Rst, ProtSet, ProtChck, ClkSet, ClkEnLp may call an interrupt Intr, for example a "Tick" interrupt used to provide real time information, stored in another memory address range AddIntr between a start address "s" and an end address "e". Furthermore, the processing of the interrupt Intr may provide for a context switch CntxSw before and after its execution, for example from a secure context to a non-secure context and back to the secure context from the non-secure context. Context switching CntxSw operations may be included in the monitoring performed by the monitoring unit SRV or possibly not if these operations are otherwise protected by other reliable mechanisms.

The start and end addresses are all referenced as "s" and "e" respectively but are of course different from one address range to another.

Reference is now made to FIG. 2B.

A call integration procedure is advantageously implemented, in order to accurately control the number of instructions executed by the first selected code portion Rst, without being distorted by instructions from the call. Furthermore, the call integration procedure allows for accurate control of the number of instructions executed by a second called code portion, for example ClkSet, as the selected code portion.

When the program counter PC points to one of the second start addresses "s", the call integration procedure comprises suspending the timing of the execution of the selected code portion; storing the value of the suspended timing; and resuming the suspended timing from the stored value, when the program counter PC points to the corresponding second end address "e", that is, when the execution of the called code portion is completed, no errors are detected, and the execution of the selected code portion resumes.

In this respect, the set of target addresses TRGT{Rst} specific to the selected reset code portion Rst includes, in addition to the end address of the selected code portion e{Rst}, "second" start addresses s{Intr}, s{ProtSet}, s{ProtChck}, s{ClkSet} of the code portions that can be called Intr, ProtSet, ProtChck, ClkSet, during the execution of the reset code portion Rst.

Thus, for example in the execution of the initialisation code portion Rst, upon calling CLL{ClkSet} the second clock modification code portion ClkSet, the program counter PC points to the second start address s{ClkSet} of this second code portion and the timing of the reset code portion Rst is suspended so that its current value is maintained in the counter or recorded.

The called second code portion, that is, the clock modification code portion ClkSet, is executed and can also be controlled by the monitoring method implemented by the monitoring unit SRV.

Reference is made in this respect to FIG. 2C.

The second clock modification code portion ClkSet is executed, and, with the clock modification code portion ClkSet as the selected code portion, the monitoring method is implemented in the same way as described above in connection with FIG. 1, with the following steps: starting a further timing when the program counter PC points to the start address of the clock modification code portion s{ClkSet}; continuously comparing the current values of the program counter PC with a set of target addresses specific to the second clock modification code portion TRGT{ClkSet} including the end address of the clock modification code portion e{ClkSet}, as well as the possible start addresses s{Intr}, s{ClkEnLp} of the other code portions Intr, ClkEnLp, which can be called CLL by the clock modification code portion ClkSet; a possible call integration procedure as described in connection with FIGS. 2B and 2C; stopping this further timing when the program counter PC points to the end address of the clock modification code portion e{ClkSet}; and generating the error signal Err if the duration of this further timing is outside a nominal duration range NmnlRng specific to the second code portion ClkSet.

After the end address of the clock modification code portion e{ClkSet}, the program counter points to the return address of the first reset code portion Rst, and the monitoring method resumes for the first reset code portion Rst, starting from the count of the suspended timing and with, in particular, the set of target addresses TRGT{Rst} and the nominal duration range NmnlRng specific to the reset code portion Rst.

Therefore, since the monitoring method is applied independently to the first selected code portion Rst and the called second code portion ClkSet, the control of the amount of executed instructions is more accurate for each of the selected code portions Rst, ClkSet.

FIGS. 3A to 3G represent examples of the implementation of the execution of a program code described above in connection with FIGS. 2A to 2C, in a time representation where time proceeds from left to right. Although the start and end addresses of code portions are denoted as "s" and "e" respectively, the start and end marks of the execution of each code portion "X" will be denoted as "s{X}" and "e{X}".

Figure 3A:
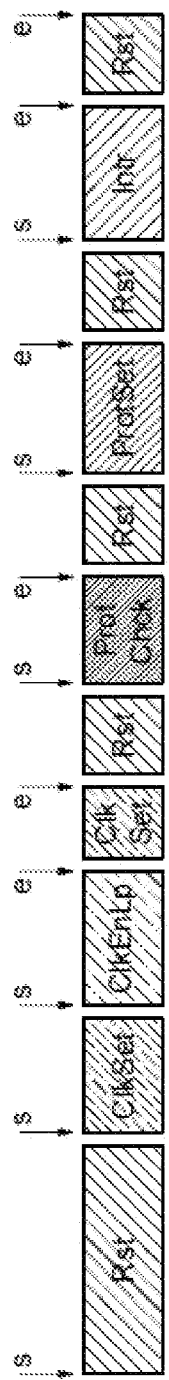
FIGS. 3A through 3G illustrate implementation of the execution of a program code, in accordance with one or more embodiments.

FIG. 3A illustrates an example of the correct execution of the reset code portion and its calls.

The monitoring method begins when the instruction located at the start address s{Rst} of the reset code portion Rst is executed.

The clock modification code portion ClkSet is called and begins at the mark s{ClkSet}, the monitoring of the reset program Rst is suspended and the monitoring method is implemented for the execution of the clock modification code ClkSet.

The clock enable loop code portion ClkEnLp is called and begins at the mark s{ClkEnLp}, the monitoring of the clock modification program ClkSet is suspended and the monitoring method is implemented for the clock enable loop ClkEnLp. The clock enable loop code portion ClkEnLp has no call function and ends at the end mark e{ClkEnLp}. If the duration timed in the monitoring of the clock enable loop code portion ClkEnLp is within the respective nominal duration range NmnlRng, then the error signal Err is not generated.

Monitoring resumes for the clock modification code portion ClkSet, executed up to the end mark e{ClkSet}, and the error signal Err is not generated if the timed duration is within the respective nominal duration range NmnlRng.

The execution and monitoring of the reset code portion Rst is resumed.

The protection check code portion ProtChck is called and begins at the mark s{ProtChck}, the monitoring of the reset program Rst is suspended and the monitoring method is implemented for the execution of the protection check ProtChck. The protection check code portion ProtChck has no call function and continues up to the end mark e{ProtChck}. The error signal Err is not generated if the timed duration is within the respective nominal duration range NmnlRng.

The execution and monitoring of the reset code portion Rst is resumed.

The protection setting code portion ProtSet is called and begins at the mark s{ProtSet}, the monitoring of the reset program Rst is suspended and the monitoring method is implemented for the execution of the protection setting ProtSet. The protection setting code portion ProtSet has no call function and continues up to the end mark e{ProtSet}. The error signal Err is not generated if the timed duration is within the respective nominal duration range NmnlRng.

Execution and monitoring of the reset code portion Rst is resumed.

The interrupt code portion Intr is called and begins at the mark s{Intr}, the monitoring of the reset program Rst is suspended and the monitoring method is implemented for the execution of the interrupt Intr. The interrupt code portion Intr has no call function and continues up to the end mark e{Intr}. The error signal Err is not generated if the timed duration is within the respective nominal duration range NmnlRng.

Execution and monitoring of the reset code portion Rst resumes, up to the end mark e{Rst}, and the error signal Err is not generated if the cumulative timed duration is within the respective nominal duration range NmnlRng.

Figure 3B:
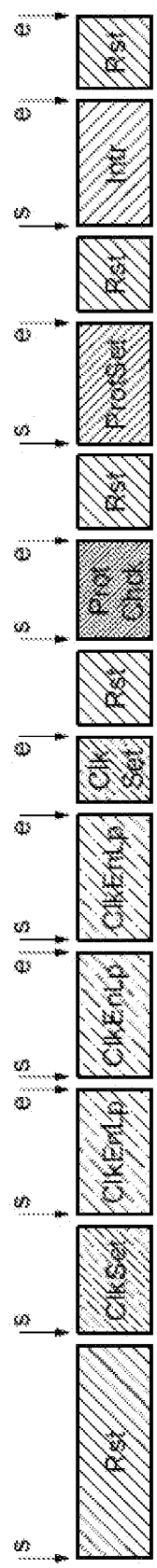

FIG. 3B illustrates another example of correct execution of the reset code portion and its calls, where the clock enable loop code portion ClkEnLp is repeated several times in series. This may be the case in practice for example to parameterise a phase locked loop.

Since the method for monitoring the execution of the code ClkSet that called the clock enable loop ClkEnLp is suspended during the successive executions of the clock enable loop ClkEnLp, the repetition of this code portion does not influence the monitoring of the other code portions. On the other hand, each execution of the clock enable loop ClkEnLp is monitored independently of the others in the series, between each marker s{ClkEnLp} and e{ClkEnLp}, and thus the number of repetitions in the series is not restricted in advance.

Figure 3C:
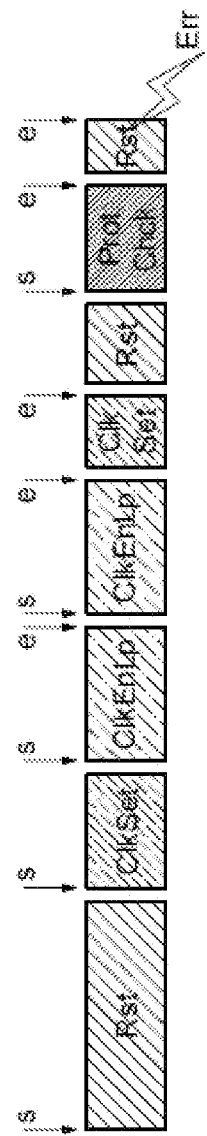

FIG. 3C illustrates an example of incorrect execution of the reset code portion Rst and its calls.

In this example, the code portions are executed correctly, within the respective nominal duration ranges NmnlRng, until the execution of the reset code Rst is resumed after the end e{ProtChck} of the protection check code portion ProtChck.

Indeed, in this example the execution of the reset code portion Rst ends e{Rst} at this moment, which stops the timing of the monitoring method of this code portion Rst too early. In this case, the timing duration is shorter than the respective nominal duration range NmnlRng and the error signal Err is generated.

Figure 3D:
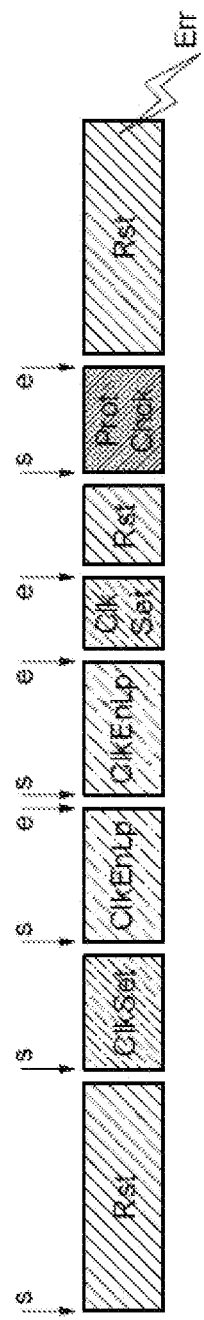

FIG. 3D illustrates another example of incorrect execution of the reset code portion Rst and its calls.

In this example, the code portions are executed correctly, within the respective nominal duration ranges NmnlRng, until the execution of the reset code Rst is resumed after the end e{ProtChck} of the protection check code portion ProtChck.

Indeed, in this example the execution of the reset code portion Rst does not end in a normal way and continues for longer than expected. As a result, the timing reaches a value above the respective nominal duration range NmnlRng, and the error signal Err is generated.

Figure 3E:
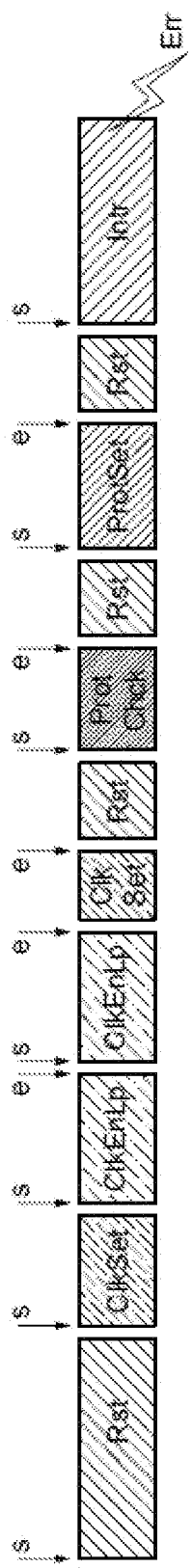

FIG. 3E illustrates another example of incorrect execution of the reset code portion Rst and its calls.

In this example, it is the execution of the interrupt code portion Intr that does not end in the normal way and continues for longer than expected. As a result, the timing reaches a value above the respective nominal duration range NmnlRng, and the error signal Err is generated.

Figure 3F:
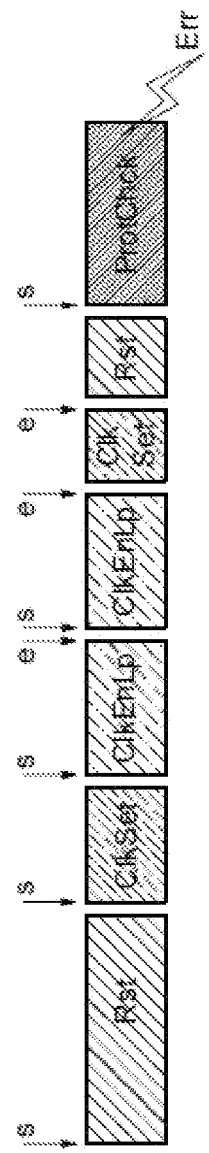

FIG. 3F illustrates another example of incorrect execution of the reset code portion Rst and its calls.

In this example, it is the execution of the protection check code portion ProtChck that does not end in the normal way and continues for longer than expected. As a result, the timing reaches a value above the respective nominal duration range NmnlRng, and the error signal Err is generated.

Figure 3G:
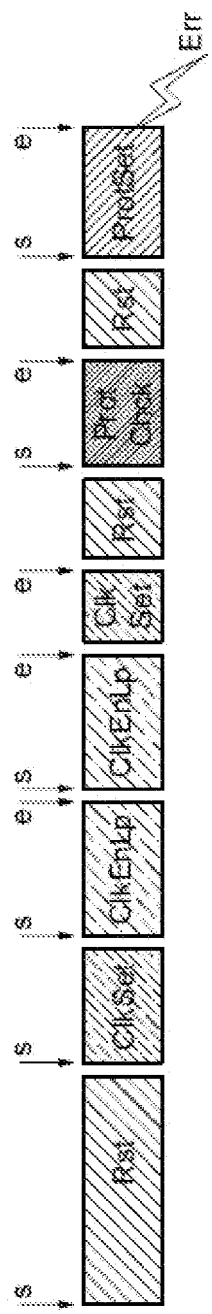

FIG. 3G illustrates another example of incorrect execution of the reset code portion Rst and its calls.

In this example, it is the execution of the protection setting code portion ProtSet that ends e{Rst} early, which stops the timing at a value below the respective nominal duration range NmnlRng, and the error signal Err is generated.

What is claimed is:

1. A method for monitoring an execution of a selected program code portion stored in a memory address range between a start address and an end address, the execution implemented by processing circuitry using a program counter pointing to an address of an instruction executed by the processing circuitry, the method comprising:

starting a timer in response to the program counter pointing to the start address of the selected program code portion;

comparing current values of the program counter with a set of target addresses specific to the selected program code portion, the set of target addresses including the end address of the selected program code portion;

stopping the timer in response to the program counter pointing to the end address of the selected program code portion;

comparing a duration of starting the timer and stopping the timer to a threshold specific to the selected program code portion, wherein the threshold is automatically adjusted based on a frequency of a clock signal clocking the execution of the processing circuitry, a cache instruction admission event, a cache data admission event, a cache data eviction event, a wait state of the processing circuitry, or a combination thereof; and generating an error signal in response to the duration being greater or less than the threshold.

2. The method according to claim 1, wherein the selected program code portion includes at least one call function configured to call a second program code portion stored in a second memory address range between a second start address and a second end address, and the set of target addresses specific to the selected program code portion includes the second start address, the method further comprising:

performing a call integration procedure when the program counter points to the second start address, the performing the call integration procedure including:
suspending the timer;
storing a value of a suspended timing corresponding to the timer starting and the timer stopping; and
resuming the suspended timing from the stored value when the program counter points to the second end address.

3. The method according to claim 2, wherein the call integration procedure further includes, with the second program code portion as the selected program code portion:
starting a further timing;
comparing the current values of the program counter with another set of target addresses specific to the second selected program code portion;
stopping the further timing; and
generating the error signal based on another nominal duration range specific to the second selected program code portion.

4. The method according to claim 3, further comprising performing a further-call integration procedure.

5. The method according to claim 1, wherein a nominal duration range is based on a number of clock cycles of a nominal execution by the processing circuitry, and a delay caused by instruction fetches from memory.

6. The method according to claim 1, wherein a timing is clocked by a second clock signal distinct from the clock signal clocking execution of the processing circuitry.

7. The method according to claim 1, wherein the selected program code portion is executed as part of at least one of a starting phase of the processing circuitry before access rights management protection mechanisms are effective, or a critical phase of the processing circuitry having a most permissive access right.

8. The method according to claim 1, wherein the threshold corresponds to a threshold range, the method further comprising generating the error signal in response to the duration being outside the threshold range.

9. A device, comprising:

processing circuitry configured to execute a selected program code portion stored in a memory address range, between a start address and an end address, and to generate a program counter pointing to an address of an executed instruction; and monitoring circuitry configured to monitor the execution of the selected program code portion, the monitoring circuitry including:
a comparator circuit configured to compare current values of the program counter with a set of target addresses specific to the selected program code portion including the end address of the selected program code portion;
a counter circuit configured to start a timing when the program counter points to the start address of the selected program code portion and to stop the timing when the program counter points to the end address of the selected program code portion; and
a decision circuit configured to generate an error signal in response to a timing duration determined by the counter circuit being outside a nominal duration range specific to the selected program code portion, the timing duration being automatically adjusted based on a frequency of a clock signal clocking the execution of the processing circuitry, a cache instruction admission event, a cache data admission event, a cache data eviction event, a wait state of the processing circuitry, or a combination thereof.

10. The device according to claim 9, wherein the selected program code portion includes at least one call function configured to call a second program code portion stored in a second memory address range between a second start address and a second end address, and the set of target addresses specific to the selected program code portion includes the second start address, the monitoring circuitry configured to:
suspend the timing with the counter circuit;
store a value of the suspended timing; and
resume the suspended timing from the stored value when the program counter points to the second end address.

11. The device according to claim 10, wherein the monitoring circuitry is configured to parameterise the comparator circuit, the counter circuit, and the decision circuit with the second program code portion as the selected program code portion, and with a set of target addresses and a nominal duration range specific to the second program code portion.

12. The device according to claim 9, wherein the nominal duration range is based on a number of clock cycles of a nominal execution by the processing circuitry, and a delay caused by instruction fetches from memory.

13. The device according to claim 9, further comprising a clock generator configured to generate the clock signal to clock the execution of the processing circuitry, wherein the counter circuit is configured to generate a distinct clock signal to clock the timing.

14. The device according to claim 9, further comprising an access rights management circuit configured to operate an access rights management protection mechanism for instructions executed by the processing circuitry, the monitoring circuitry configured to monitor the selected program code portion belonging to a starting phase of the execution of a program code by the processing circuitry, before the access rights management protection mechanisms are operational, or belonging to a critical phase of the execution by the processing circuitry having a most permissive access right.

15. The device according to claim 9, wherein the set of target addresses further includes a start address of a second code portion that is called by the selected program code portion, and wherein the counter circuit is further configured to:
   suspend the timing in response to the program counter matching the start address of the second code portion;
   store a value of a duration of the timing in response to the suspending; and
   resume the timing from the stored value in response to the program counter matching an end address of the second code portion.

16. A monitoring circuit configured to monitor execution, by code processing circuitry, of a selected program code portion stored in a program memory address range between a start address and an end address, the monitoring circuit comprising:
   monitoring processing circuitry; and
   a memory storing monitoring program code that, when executed by the monitoring processing circuitry, causes the monitoring processing circuitry to:
      compare current values of a program counter generated by the processing circuitry with a set of target addresses specific to the selected program code portion including the end address of the selected program code portion;
      start a timing when the program counter points to the start address of the selected program code portion;
      stop the timing when the program counter points to the end address of the selected program code portion; and
      generate an error signal in response to a timing duration from the starting of the timing to the stopping of the timing being outside a nominal duration range specific to the selected program code portion, the timing duration being automatically adjusted based on a frequency of a clock signal clocking the execution of the processing circuitry, a cache instruction admission event, a cache data admission event, a cache data eviction event, a wait state of the processing circuitry, or a combination thereof.

17. The monitoring circuit according to claim 16, wherein the selected program code portion includes at least one call function configured to call a second program code portion stored in a second memory address range between a second start address and a second end address, and the set of target addresses specific to the selected program code portion includes the second start address.

18. The monitoring circuit according to claim 16, wherein the nominal duration range is based on a number of clock cycles of a nominal execution by the processing circuitry, and a delay caused by instruction fetches from memory.

19. The monitoring circuit according to claim 16, further comprising a clock generator configured to generate a first clock signal to clock the execution of the processing circuitry, wherein the monitoring circuit comprises a second clock generator configured to generate a second clock signal to clock the timing.

20. The monitoring circuit according to claim 16, wherein the set of target addresses further includes a start address of a second code portion that is called by the selected program code portion, and wherein the monitoring circuit is further configured to:
   suspend the timing in response to the program counter matching the start address of the second code portion;
   store a value of a duration of the timing in response to the suspending; and
   resume the timing from the stored value in response to the program counter matching an end address of the second code portion.

* * * * *